(12) United States Patent
Chen et al.

(10) Patent No.: US 12,606,103 B2
(45) Date of Patent: Apr. 21, 2026

(54) VEHICLE-MOUNTED DISPLAY MODULE AND VEHICLE

(71) Applicant: BOE Technology Group Co., Ltd., Beijing (CN)

(72) Inventors: Sitong Chen, Beijing (CN); Yue Lei, Beijing (CN); Yue Cui, Beijing (CN); Yuanjie Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 188 days.

(21) Appl. No.: 18/576,720

(22) PCT Filed: Mar. 29, 2023

(86) PCT No.: PCT/CN2023/084566
§ 371 (c)(1),
(2) Date: Jan. 4, 2024

(87) PCT Pub. No.: WO2024/197617
PCT Pub. Date: Oct. 3, 2024

(65) Prior Publication Data
US 2025/0091525 A1 Mar. 20, 2025

(51) Int. Cl.
B60R 11/02 (2006.01)
B60R 11/00 (2006.01)

(52) U.S. Cl.
CPC ... B60R 11/0235 (2013.01); B60R 2011/0084 (2013.01); B60R 2011/0087 (2013.01); B60R 2011/0092 (2013.01)

(58) Field of Classification Search
CPC ......... B60R 11/0235; B60R 2011/0084; B60R 2011/0087; B60R 2011/0092;
(Continued)

(56) References Cited

U.S. PATENT DOCUMENTS 11,678,446 B2 * 6/2023 Song ................... H05K 5/0217
361/688
2012/0268665 A1 10/2012 Yetukuri et al.
(Continued)

FOREIGN PATENT DOCUMENTS

| CN | 112309258 A | 2/2021 |
| CN | 112866451 A | 5/2021 |

(Continued)

*Primary Examiner* — Nathnael Aynalem
(74) *Attorney, Agent, or Firm* — IPro, PLLC

(57) ABSTRACT

Provided is a vehicle-mounted display module. The vehicle-mounted display module vehicle-mounted display module includes an auxiliary deformation device and a deformable display screen; wherein the auxiliary deformation device comprises a drive mechanism, a securing mechanism, and a support mechanism; the securing mechanism is disposed on a side of the drive mechanism and is securably connected to the drive mechanism, and the securing mechanism is configured to secure a first local structure of the drive mechanism; the support mechanism is disposed on a side, away from the securing mechanism, of the drive mechanism and is securably connected to the drive mechanism, and the support mechanism is configured to reciprocate in a first direction under drive of a second local structure of the drive mechanism.

19 Claims, 13 Drawing Sheets

(58) Field of Classification Search
CPC ............. B60R 11/02; B60R 2011/0091; B60R 2011/0082; B60R 2011/008; G09F 9/30; G09F 9/301; G03B 21/58; G06F 1/1652; G06F 1/1624; G06F 1/1615; G06F 1/1637; H04M 1/0268; H04M 1/0237
USPC ........................................................ 348/837
See application file for complete search history.

(56) References Cited

U.S. PATENT DOCUMENTS

| | | | | |
|---|---|---|---|---|
| 2022/0124913 A1* | 4/2022 | Kwak | ........................ | G09F 9/30 |
| 2022/0183167 A1* | 6/2022 | Liu | ...................... | H05K 5/0217 |
| 2022/0418123 A1* | 12/2022 | Liu | .................... | H04M 1/0237 |
| 2023/0044285 A1* | 2/2023 | Jin | ........................ | G06F 1/1652 |
| 2023/0213140 A1* | 7/2023 | Kim | .................... | H05K 5/0247 |
| | | | | 361/679.01 |

FOREIGN PATENT DOCUMENTS

| | | | |
|---|---|---|---|
| CN | 113085738 A | 7/2021 |
| CN | 113099012 A | 7/2021 |
| CN | 114125106 A | 3/2022 |
| CN | 114889532 A | 8/2022 |
| CN | 218241211 U | 1/2023 |
| WO | 2021189352 A1 | 9/2021 |

* cited by examiner 1011 (1012)

1011 (1012)

101

101

20

20

12

13

VEHICLE-MOUNTED DISPLAY MODULE AND VEHICLE

CROSS-REFERENCE TO RELATED APPLICATION

This application is a U.S. national phase application based on PCT/CN2023/084566, filed on Mar. 29, 2023, the disclosure of which is incorporated herein by reference in its entirety.

TECHNICAL FIELD

Embodiments of the present disclosure relates to the field of display technologies, and in particular, relates to a vehicle-mounted display module and a vehicle.

BACKGROUND OF THE INVENTION

In recent years, with the application of flexible visualization equipment, a bending feature has become a trend in the display industry. However, there are still difficulties in the design for driving a display screen to roll up and expand.

SUMMARY OF THE INVENTION

According to some embodiments of the present disclosure, a vehicle-mounted display module is provided. The vehicle-mounted display module includes an auxiliary deformation device and a deformable display screen, wherein the auxiliary deformation device includes a drive mechanism, a securing mechanism, and a support mechanism;

the securing mechanism is disposed on a side of the drive mechanism and is securably connected to the drive mechanism, and the securing mechanism is configured to secure a first local structure of the drive mechanism;

the support mechanism is disposed on a side, away from the securing mechanism, of the drive mechanism and is securably connected to the drive mechanism, and the support mechanism is configured to reciprocate in a first direction under drive of a second local structure of the drive mechanism;

a side, away from the drive mechanism, of the support mechanism is configured to support the deformable display screen; and one end of the deformable display screen is secured on the support mechanism, the other end of the deformable display screen is secured on the securing mechanism, and the deformable display screen is configured to expand or roll up under drive of the support mechanism.

In some embodiments, the drive mechanism includes a motor module, a slider, and a securing frame;

the first local structure includes the slider, wherein the slider is securably connected to the securing mechanism;

the second local structure includes the motor module and the securing frame, and the securing frame is securably connected to the support mechanism and the motor module;

the motor module is movably connected to the slider; and the motor module is configured to reciprocate in the first direction relative to the slider, such that the support mechanism is driven to reciprocate in the first direction.

In some embodiments, the drive mechanism includes a motor module, a slider, and a lap plate;

the first local structure includes the motor module, wherein the motor module is securably connected to the securing mechanism;

the second local structure includes the slider and the lap plate, and the lap plate is securably connected to the support mechanism and the slider;

the motor module is movably connected to the slider; and the slider is configured to reciprocate in the first direction relative to the motor module, such that the support mechanism is driven to reciprocate in the first direction.

In some embodiments, the motor module includes a motor frame, a motor body, and a first shaft;

the motor body is connected to the first shaft, wherein the first shaft is capable of rotating about an axis thereof under drive of the motor body;

the motor body is disposed on a side of the motor frame, and the first shaft runs through a cavity defined by the motor frame; and the slider is provided with a first hole running through the slider in a thickness direction thereof, the first shaft is adapted to the first hole and runs through the first hole, and the first shaft is capable of clockwise rotation and counterclockwise rotation to allow the slider to move up and down along the first shaft.

In some embodiments, the motor frame includes a first wall plate, a second wall plate, a third wall plate, and a fourth wall plate;

a plate surface of the first wall plate is arranged opposite to a plate surface of the second wall plate;

a groove is formed on an edge end surface at one end of each of the first wall plate and the second wall plate;

a first securing hole is formed on the other end of each of the first wall plate and the second wall plate opposite to the groove;

a plate surface of the third wall plate is arranged opposite to a plate surface of the fourth wall plate, and the third wall plate and the fourth wall plate are connected to the first wall plate and the second wall plate; and the motor body is disposed on a side, away from the cavity, of the third wall plate, and the first shaft runs through the third wall plate and extends to be movably connected to the fourth wall plate.

In some embodiments, the grooves are disposed at the ends, close to the securing mechanism, of the first and second wall plates;

the first securing holes are disposed on side surfaces, close to an end of the support structure and away from the cavity, of the first and second wall plates;

the securing frame is adapted to a shape of the motor frame; and the securing frame is provided with second securing holes corresponding to positions of the first securing holes, and the securing frame and the motor frame are securably connected by means of the second securing holes, the first securing holes, and first connectors.

In some embodiments, an end, close to the support mechanism, of the slider is provided with third securing holes; and the securing mechanism includes a securing seat, wherein the securing seat is provided with fourth securing holes corresponding to positions of the third securing holes, and the securing seat and the slider are securably connected by means of the fourth securing holes, the third securing holes, and second connectors.

In some embodiments, the grooves are disposed at the ends, close to the support mechanism, of the first and second wall plates;

the first securing holes are disposed on side surfaces, close to an end of the securing mechanism and away from the cavity, of the first and second wall plates;

the securing mechanism includes a securing seat, wherein the securing seat is adapted to a shape of the motor frame; and the securing seat is provided with fifth securing holes corresponding to positions of the first securing holes, and the securing seat and the motor frame are securably connected by means of the fifth securing holes, the first securing holes, and third connectors.

In some embodiments, an end, close to the support mechanism, of the slider is provided with third securing holes; and the lap plate is provided with sixth securing holes corresponding to positions of the third securing holes, and the lap plate and the slider are securably connected by means of the sixth securing holes, the third securing holes, and fourth connectors.

In some embodiments, the slider includes a body portion and a first protrusion portion;

the first protrusion portion is disposed on a side, close to the support mechanism, of the body portion; and the third securing holes are disposed in a side surface, close to the support mechanism, of the first protrusion portion, or the third securing holes are disposed in a side surface, close to the fourth wall plate, of the first protrusion portion.

In some embodiments, the slider further includes a second protrusion portion disposed on a side, close to the securing mechanism, of the body portion, and the second protrusion portion, the body portion and the first protrusion portion are integrally formed.

In some embodiments, the groove includes a bottom groove surface and a side groove surface, and an angle between the bottom groove surface and the side groove surface ranges from 45° to 135°.

In some embodiments, a shape of an orthographic projection of the groove on a surface of the first wall plate or the second wall plate includes a rectangle, a trapezoid or an inverted trapezoid.

In some embodiments, the first wall plate includes a first edge end surface and a second edge end surface opposite to the first edge end surface;

the groove is disposed on the second edge end surface, and a distance between the bottom groove surface of the groove and the first edge end surface is t, a distance between the first edge end surface and the second edge end surface is L;

$2t \geq L$; and the second wall plate has the same size and shape as the first wall plate.

In some embodiments, the motor frame further includes a back wall plate disposed on sides of the first and second wall plates away from the grooves thereof, the back wall plate is connected to the first wall plate, the second wall plate, the third wall plate, and the fourth wall plate; and a hollowed-out pattern is disposed in the back wall plate.

In some embodiments, an area of an orthographic projection of the hollowed-out pattern on the back wall plate less than or equal to 50% of an area of a surface of the back wall plate.

In some embodiments, the hollowed-out pattern includes any one of a rectangular opening, a plurality of diagonal stripe openings, a plurality of horizontal stripe openings, and a grid opening.

In some embodiments, the motor frame further includes a first guide rod and a second guide rod;

the first guide rod and the second guide rod are disposed between the third wall plate and the fourth wall plate, and are connected to the third wall plate and the fourth wall plate; the first guide rod and the second guide rod are parallel to each other; and the slider is provided with a seventh hole and an eighth hole, wherein the seventh hole and the eighth hole run through the slider in a thickness direction thereof, the seventh hole and the eighth hole are disposed on two opposite sides of the first hole, the first guide rod runs through the seventh hole, and the second guide rod runs through the eighth hole.

In some embodiments, the securing mechanism further includes a storage box and a first comb plate;

the storage box is disposed below the securing seat and is securably connected to the securing seat; the storage box is configured to store the deformable display screen in a rolled-up state;

the storage box is connected to the first comb plate, and an angle greater than 0° is formed between a plane where the storage box is disposed and the first comb plate;

the support mechanism includes a support plate, wherein the support plate is disposed on the same plane as the first comb plate;

the support plate includes a first portion and a second portion, wherein the first portion and the second portion are formed into a whole, and the first portion is disposed between the second portion and the first comb plate; and the first portion has a comb structure, and comb teeth of the first portion are interleaved and meshed with comb teeth of the first comb plate.

In some embodiments, the securing mechanism further includes a reel and a bearing, wherein the reel and the bearing are disposed in a connection region between the storage box and the first comb plate, the bearing is securably connected to the storage box, and both ends of the reel are embedded into and movably connected with the bearing; and the reel is exposed in the connection region between the storage box and the first comb plate, to form a support for the deformable display screen.

Some embodiments of the present disclosure further provide a vehicle, including a vehicle-mounted display module.

BRIEF DESCRIPTION OF THE DRAWINGS

The accompanying drawings are provided for further understanding of the embodiments of the present disclosure, and constitute part of the Description. These drawings, together with the embodiments of the present disclosure, serve to explain the present disclosure, but do not constitute a limitation to the present disclosure. The above and other characteristics and advantages will become more apparent to those skilled in the art by describing the exemplary embodiments in detail with reference to the accompanying drawings, in which.

DETAILED DESCRIPTION

Figure 1A:
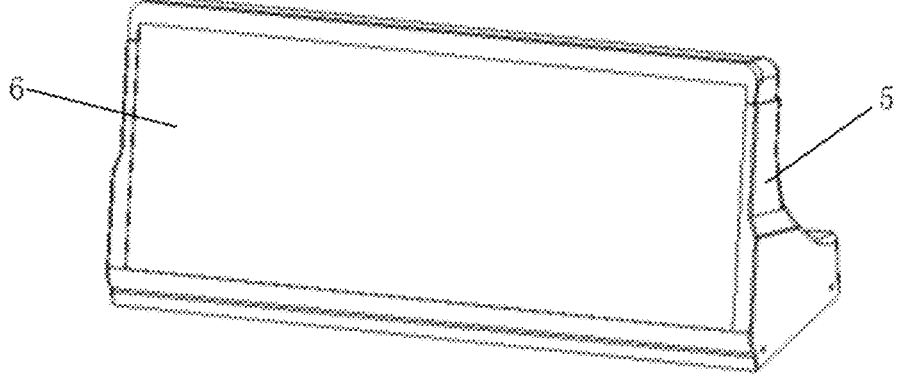
FIG. 1a shows a schematic diagram of a whole structure of a flexible sliding/rolling-up display device in a rolled-up state according to some practice.

In order to enable those skilled in the art to better understand the technical solutions of the embodiments of the present disclosure, a vehicle-mounted display module and a vehicle provided by the embodiments of the present disclosure are further described in detail below in conjunction with the accompanying drawings and specific embodiments.

The embodiments of the present disclosure will be fully described hereinafter with reference to the accompanying drawings. However, the embodiments shown can be implemented in different modes and should not be interpreted as being limited to the embodiments elaborated in the present disclosure. Instead, these embodiments are provided for the purpose of making the present disclosure thorough and complete, and enabling those skilled in the art to fully understand the scope of the present disclosure.

The embodiments of the present disclosure are not limited to the embodiments shown in the accompanying drawings, but include modifications to the configuration on the basis of the manufacturing process. Therefore, a region illustrated in the accompanying drawings is schematic, and the shape of the region shown in the drawings illustrates the specific shape of this region, but is not intended to be restrictive.

Figure 1B:
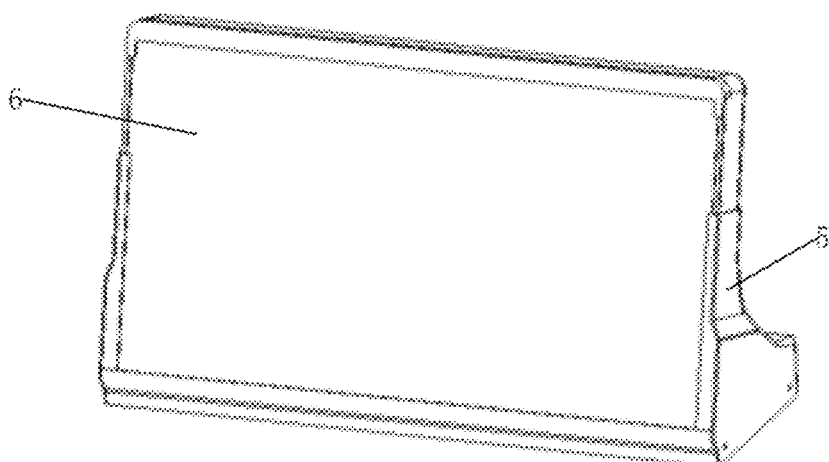
FIG. 1b shows a schematic diagram of a whole structure of a flexible sliding/rolling-up display device in an expanded state according to some practice.
Figure 1C:
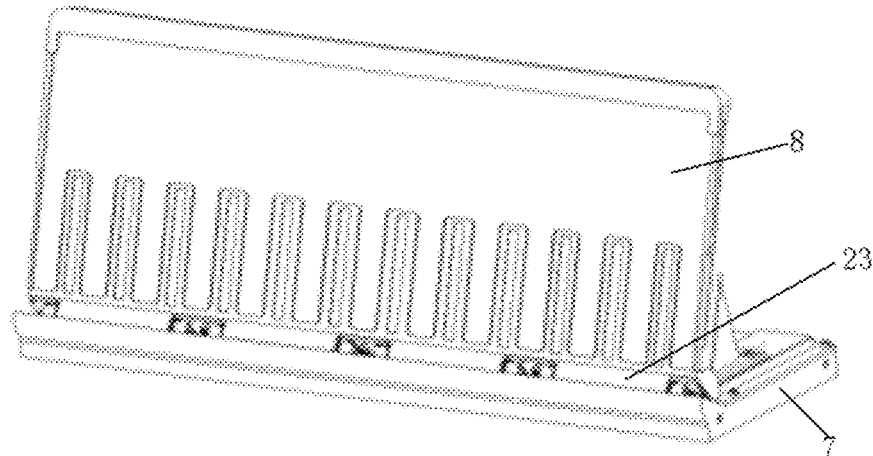
FIG. 1c shows a schematic structural diagram of an auxiliary deformation mechanism in a flexible sliding/rolling-up display device according to some practice.
Figure 1D:
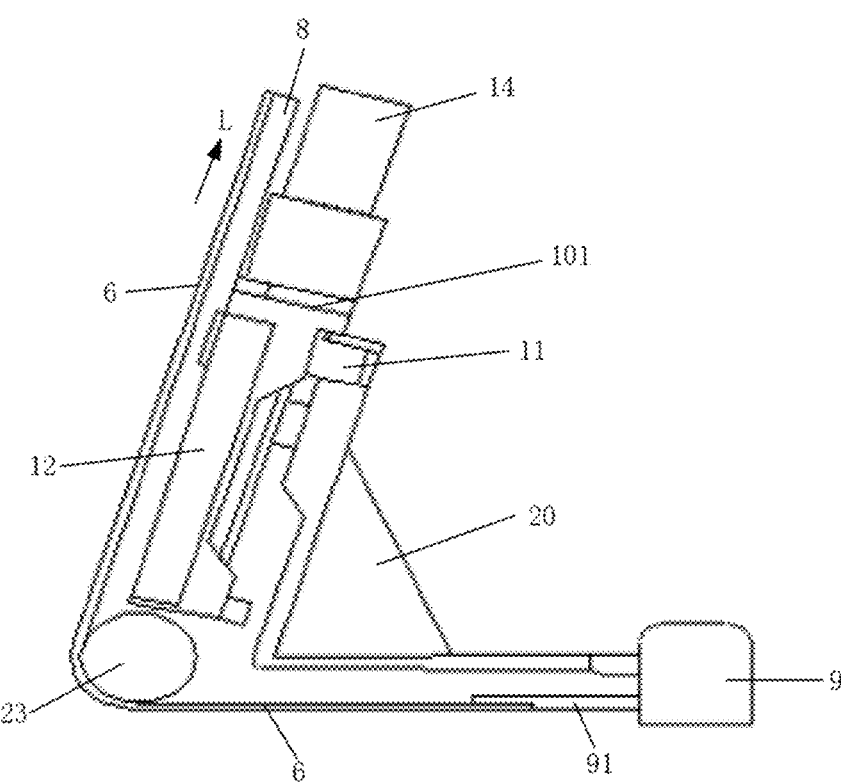
FIG. 1d shows a schematic structural sectional view of a flexible sliding/rolling-up display device according to some practice.

Referring to FIGS. 1a, 1b, 1c and 1d, FIG. 1a shows a schematic diagram of a whole structure of a flexible sliding/rolling-up display device in a rolled-up state according to some practice; FIG. 1b shows a schematic diagram of a whole structure of a flexible sliding/rolling-up display device in an expanded state according to some practice; FIG. 1c shows a schematic structural diagram of an auxiliary deformation mechanism in a flexible sliding/rolling-up display device according to some practice; and FIG. 1d shows a schematic structural sectional view of a flexible sliding/rolling-up display device according to some practice. The flexible sliding/rolling-up display device includes an auxiliary deformation mechanism 5 and a flexible display screen 6, and the auxiliary deformation mechanism 5 assists the flexible display screen 6 in rolling-up and expanding, thereby achieving the rolled-up and expanded states of the flexible display screen 6. The flexible sliding/rolling-up display device is generally used as a vehicle-mounted display device.

Referring to FIGS. 1c and 1d, the auxiliary deformation mechanism includes a securing housing 7, a support housing 8, a drive mechanism, a reel 23 and a tensioning system 9. The securing housing 7 is configured to support the support housing 8, the drive mechanism and the reel 23, and also to accommodate a rolling-up portion of the flexible display screen 6 in a rolled-up state. The support housing 8 is configured to form a support for the flexible display screen 6 in the rolled-up and expanded states. The drive mechanism is connected to the support housing 8 for driving the support housing 8 to move up and down in a first direction L, to thus roll up and expand the flexible display screen 6. The reel 23 is configured to assist the flexible display screen 6 in rolling-up and expanding, and to form a support for the flexible display screen 6 during sliding and rolling-up. The tensioning system 9 is arranged at the end, away from the support housing 8, of the securing housing 7, and the tensioning system 9 is provided therein with a roller (not shown in the figure). One end of the flexible display screen 6 is glued to the support housing 8, and the other end of the flexible display screen is tightened by the tensioning system 9. The flexible display screen 6 in the rolled-up state can be wound on the roller in the tensioning system 9.

The tensioning system 9 is connected to the other end of the flexible display screen 6 by using a polyimide (PI) bar 91. A constant force device such as a coil spring (not shown in the figure) is arranged inside the tensioning system 9 to implement tensioning by means of the stretching and retracting of the coil spring in the case that the flexible display screen 6 is expanded and rolled-up.

A motor module is used as the drive module, and the motor module is secured to the support housing 8 by means of a securing frame 12. The motor module is connected to the securing housing 7 by means of the securing seat 20, and the securing seat 20 and the securing housing 7 implements the securing of non-moving parts in the motor module. The moving parts in the motor module drives the support housing 8 to move up and down in the first direction L, thereby allowing the rolling-up and expanding of the flexible display screen 6.

The motor module includes motor frame 101, a motor 14 and a slider 11. The motor 14 is installed on the motor frame 101. A power output shaft of the motor 14 is connected to a screw rod (not shown in the figure). The slider 11 is nested with the screw rod, such that the slider 11 moves up and down along the screw rod in the case that the screw rod autorotates clockwise or counterclockwise under the drive of the power output shaft.

In some practice, the motor frame 101 is securably connected to the support housing 8, and the slider 11 is securably connected to the securing seat 20. That is, in the sliding and rolling-up process of the flexible display screen 6, the motor frame 101 and the motor 14 move up and down relative to the securing slider 11 as a whole, such that the support housing 8 is driven to move up and down, thereby allowing the expanding and rolling-up of the flexible display screen 6.

Figure 1E:
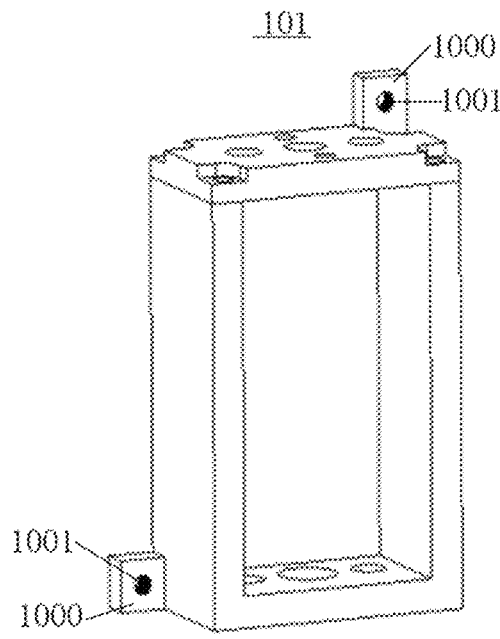
FIG. 1e shows a schematic structural diagram of a motor frame in a motor module according to some practice.

Referring to FIG. 1*e*, it shows a schematic structural diagram of a motor frame in a motor module in some practice. The motor frame 101 consists of four wall plates (up down, left and right) defining an annular frame. In order to ensure that the strength of the motor frame 101 meets its stress requirements, the thickness of the four wall plates is relatively large. The motor frame 101 is provided with protruding blocks 1000 at least on diagonal positions, and each protruding block 1000 is provided with a securing hole 1001, which is configured to allow the secured connection between the motor frame 101 and the support housing 8. The above structure of the motor frame 101 makes its overall weight larger and its energy consumption higher when moving.

In some practice, the drive mechanism has a simple drive mode, and the complete set of drive mechanism has a larger footprint and a larger weight, which is not conducive to solving the problem concerning footprint and production cost and also brings inconvenience to its handling.

Figure 2A:
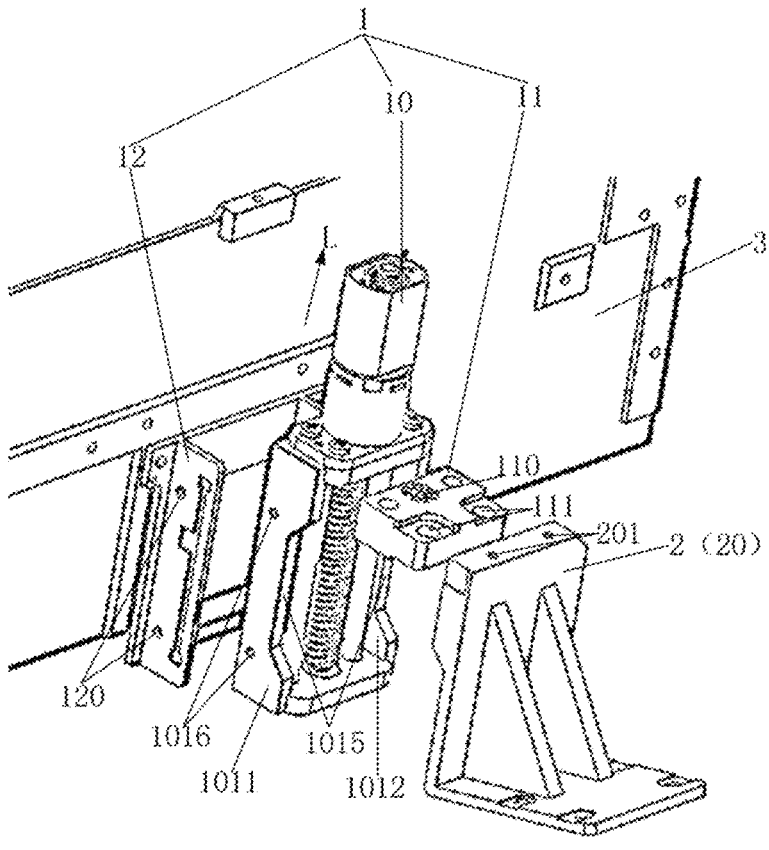
FIG. 2a shows a schematic structural diagram of a vehicle-mounted display module according to some embodiments of the present disclosure.
Figure 2B:
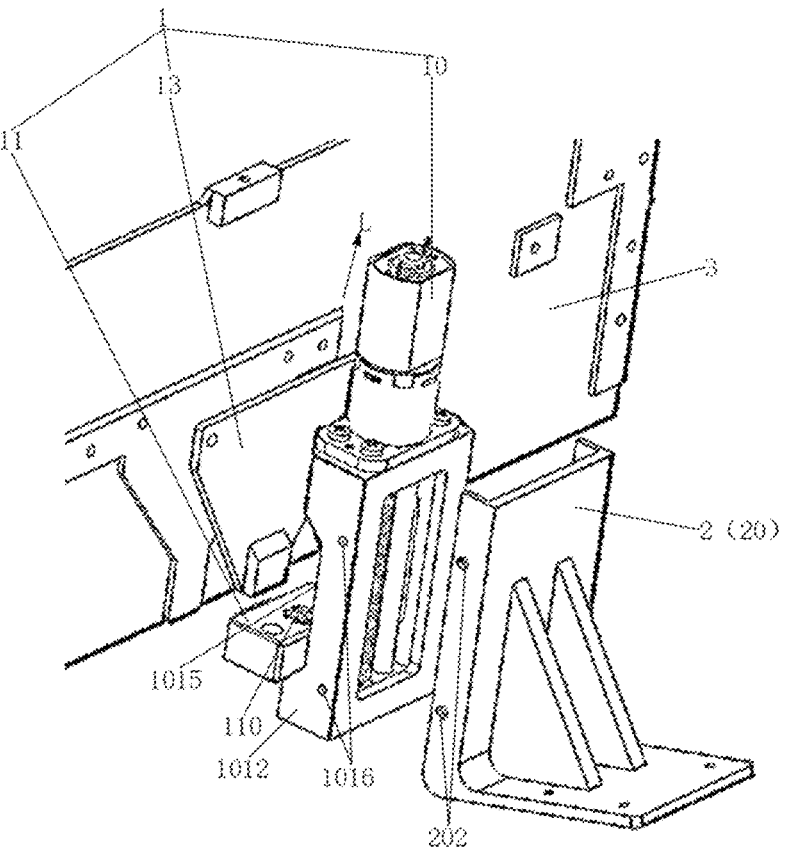
FIG. 2b shows another schematic structural diagram of a vehicle-mounted display module according to some embodiments of the present disclosure.

In order to solve the above-mentioned problems existing in some practice, some embodiments of the present disclosure provide a vehicle-mounted display module. Referring to FIG. 2*a* and FIG. 2*b*, FIG. 2*a* shows a schematic structural diagram of a vehicle-mounted display module according to some embodiments of the present disclosure, and FIG. 2*b* shows another schematic structural diagram of the vehicle-mounted display module according to some embodiments of the present disclosure. The vehicle-mounted display module includes an auxiliary deformation device and a deformable display screen. The auxiliary deformation device includes a drive mechanism 1, a securing mechanism 2, and a support mechanism 3. The securing mechanism 2 is disposed on a side of the drive mechanism 1 and is securably connected to the drive mechanism 1, and the securing mechanism 2 is configured to secure a first local structure of the drive mechanism 1. The support mechanism 3 is disposed on a side, away from the securing mechanism 2 and is securably connected to the drive mechanism, of the drive mechanism 1 1, and the support mechanism 3 is configured to reciprocate in a first direction L under the drive of a second local structure of the drive mechanism 1. A side, away from the drive mechanism 1, of the support mechanism 3 is configured to form a support for the deformable display screen. One end of the deformable display screen is secured on the support mechanism 3, the other end of the deformable display screen is secured on the securing mechanism 2, and the deformable display screen is configured to expand or roll up under the drive of the support mechanism 3.

The deformable display screen is expanded or rolled-up in the first direction L under the support of the support mechanism 3.

In some embodiments, the deformable display screen is a flexible display screen, a flexible projection screen, or any other flexible deformable screens.

In some embodiments, the vehicle-mounted display module acts as a vehicle-mounted display device. For example, the vehicle-mounted display module is installed at the position of a dashboard in a vehicle for a driver or a passenger in a co-driver position to view; or, the vehicle-mounted display module is also installed on an extendable bracket at the top in the vehicle, such that in the case that viewing is needed, the extendable bracket is extended downwards to lower the vehicle-mounted display module to a viewing height position for the passenger. The vehicle-mounted display module is installed in the middle region at the top in the vehicle by means of the extendable bracket for passengers in the rear of the vehicle to view after the vehicle-mounted display module is lowered.

In some embodiments, referring to FIG. 2*a*, the drive mechanism 1 includes a motor module 10, a slider 11 and a securing frame 12. A first local structure includes the slider 11, which is securably connected to the securing mechanism 2. A second local structure includes the motor module 10 and the securing frame 12, and the securing frame 12 is securably connected to the support mechanism 3 and the motor module 10. The motor module 10 is movably connected to the slider 11. The motor module 10 is configured to reciprocate in the first direction L relative to the slider 11 to drive the support mechanism 3 to reciprocate in the first direction L.

In some embodiments, referring to FIG. 2*b*, the drive mechanism 1 includes a motor module 10, a slider 11 and a lap plate 13. A first local structure includes the motor module 10, which is securably connected to the securing mechanism 2. A second local structure includes the slider 11 and the lap plate 13, and the lap plate 13 is securably connected to the support mechanism 3 and the slider 11. The motor module 10 is movably connected to the slider 11. The slider 11 is configured to reciprocate in the first direction L with respect to the motor module 10 to drive the support mechanism 3 to reciprocate in the first direction L.

Referring to FIGS. 2*a* and 2*b*, in FIG. 2*a*, the slider 11 is secured, and the motor module 10 moves relative to the slider 11 to drive the support mechanism 3 to move, thereby allowing the rolling-up and expanding of the deformable display screen. In FIG. 2b, the motor module 10 is stationery, and the slider 11 moves relative to the motor module 10 to drive the support mechanism 3 to move, thereby allowing the rolling-up and expanding of the deformable display screen. That is, in the embodiment of the present disclosure, the drive mechanism 1 allows and is compatible with two different drive modes. That is, the drive mechanism 1 allows and is compatible with two different force application modes. Hence, compared with the drive mechanism in some practice, the drive mode of the drive mechanism 1 in this embodiment is diversified, and can be selected for the vehicle-mounted display module in different application scenarios, which reduces the difficulty in driving the rolling-up and expanding of the deformable display screen in different application scenarios.

Figure 2C:
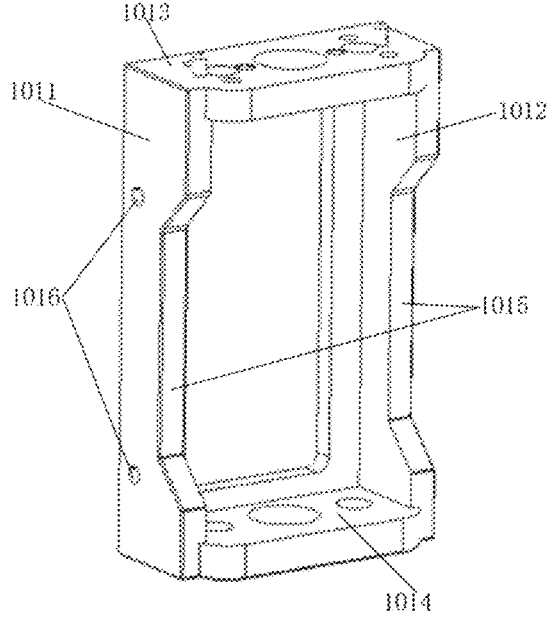
FIG. 2c shows a schematic structural diagram of a motor frame according to some embodiments of the present disclosure.
Figure 2D:
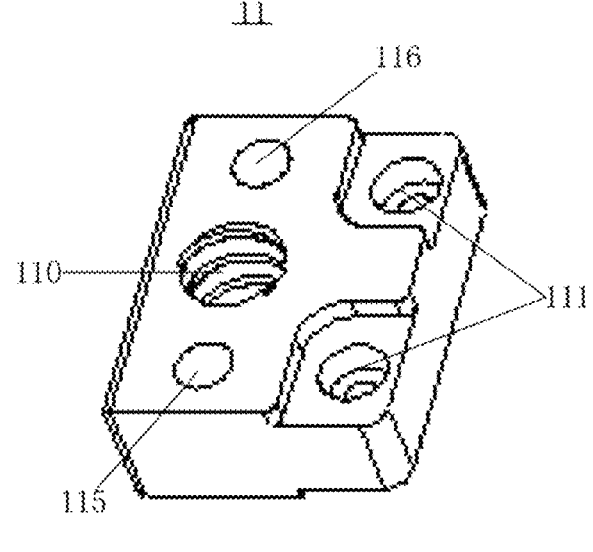
FIG. 2d shows a schematic structural diagram of a slider according to some embodiments of the present disclosure.
Figure 2E:
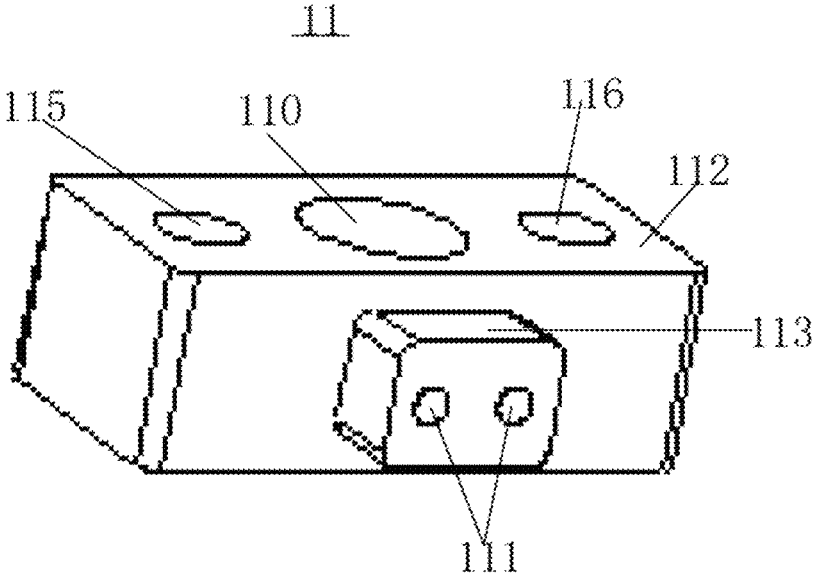
FIG. 2e shows a schematic structural diagram of another slider according to some embodiments of the present disclosure.
Figures 2F, 2G:
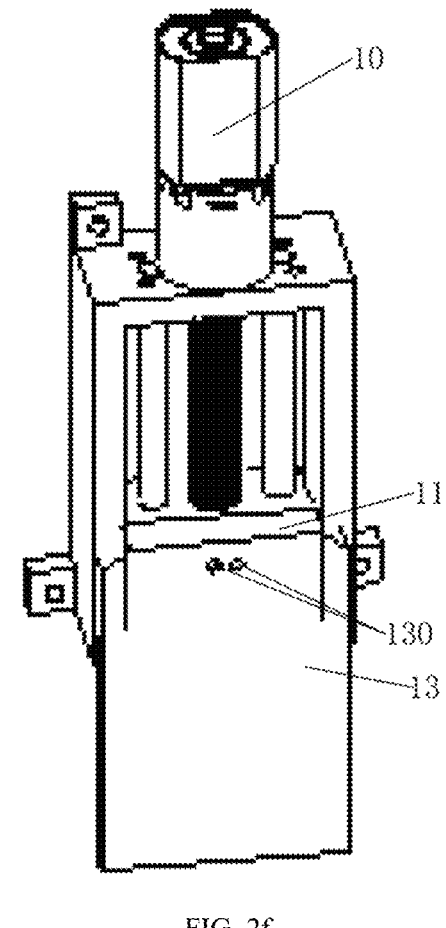
FIG. 2f shows a schematic structural diagram of an assembly of the slider shown in FIG. 2e and a lap plate.
FIG. 2g shows a schematic structural diagram of still another slider according to some embodiments of the present disclosure.
Figure 2H:
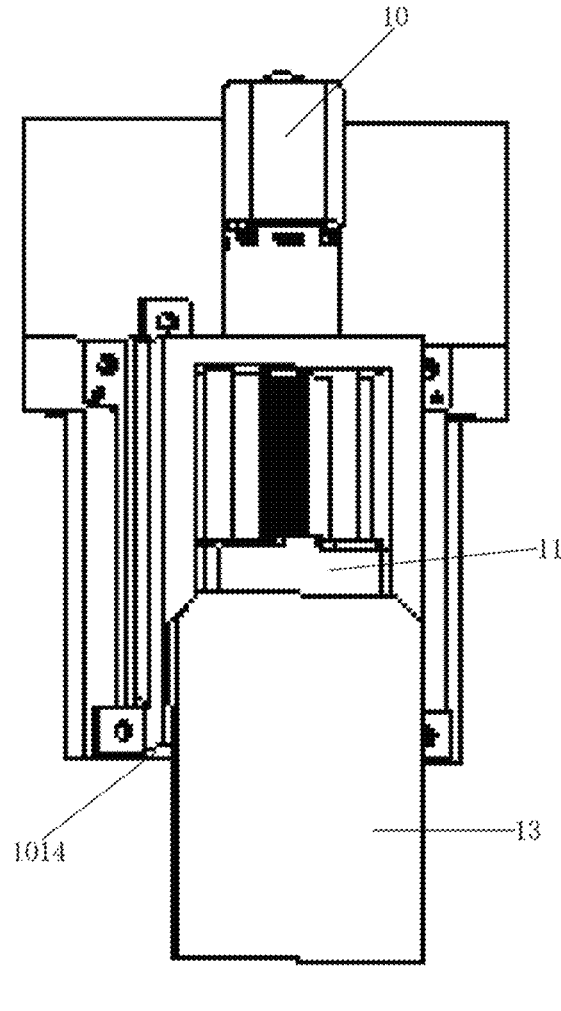
FIG. 2h shows a schematic structural diagram of an assembly of the slider shown in FIG. 2g and a lap plate.
Figure 2I:
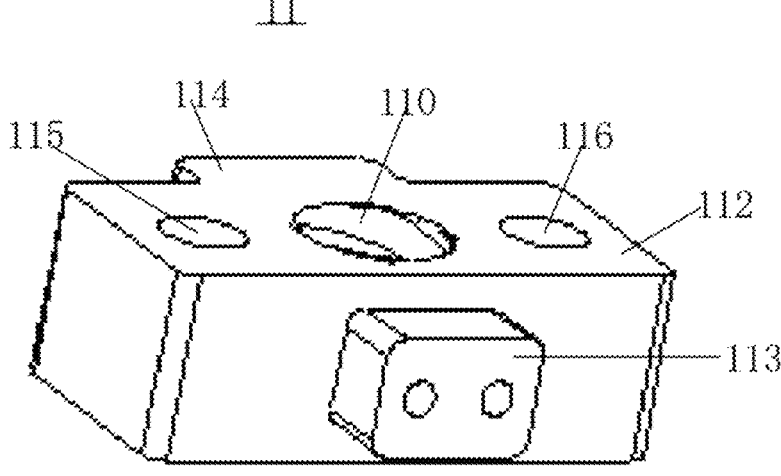
FIG. 2i shows a schematic structural diagram of still another slider according to some embodiments of the present disclosure.
Figure 2J:
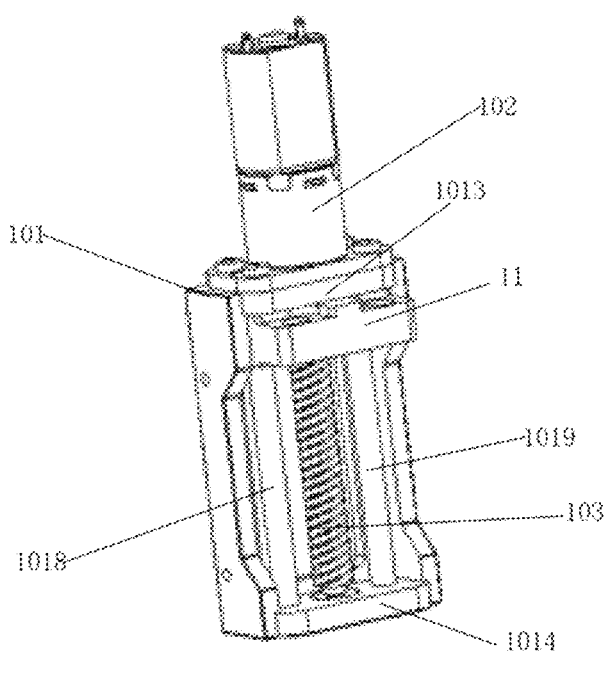
FIG. 2j shows a schematic structural diagram of a motor module according to some embodiments of the present disclosure.
Figure 2K:
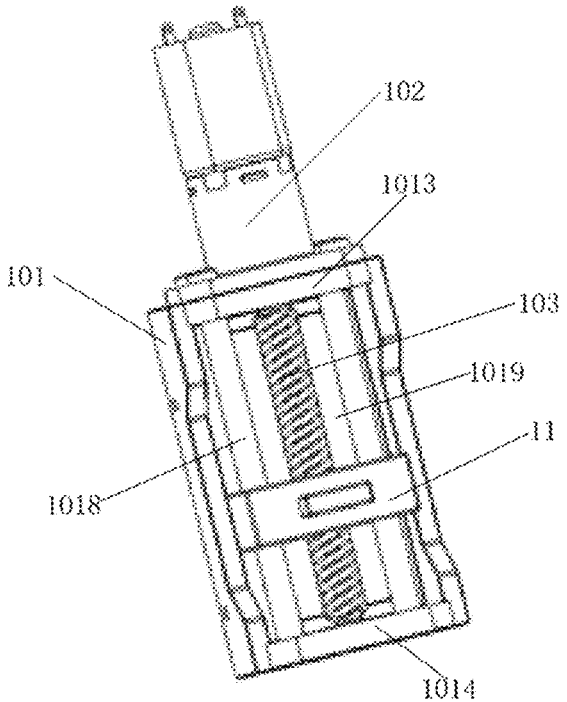
FIG. 2k shows a schematic structural diagram of another motor module according to some embodiments of the present disclosure.

In some embodiments, referring to FIGS. 2a, 2b, 2j and 2k, FIG. 2j shows a schematic structural diagram of a motor module according to some embodiments of the present disclosure. FIG. 2k is a schematic structural diagram of another motor module according to some embodiments of the present disclosure. The motor module 10 includes a motor frame 101, a motor body 102 and a first shaft 103. The motor body 102 is connected to the first shaft 103, which is capable of rotating about an axis thereof under the drive of the motor body 102. The motor body 102 is disposed on one side of the motor frame 101, and the first shaft 103 runs through a cavity defined by the motor frame 101. The slider 11 is provided with a first hole 110 running through the slider 11 in the thickness direction thereof, and the first shaft 103 runs through the first hole 110 and is adapted to the first hole 110. The first shaft 103 is capable of rotating about its axis clockwise and counterclockwise to allow the slider 11 to move up and down along the first shaft 103.

In some embodiments, the first shaft 103 is a screw rod connected to a motor shaft of the motor body 102, and the screw rod is capable of rotating about its axis under the drive of the motor shaft. The first hole 110 is a threaded hole. Thus, in the case that the screw rod rotates, the slider 11 moves up and down along the screw rod.

In some embodiments, referring to FIG. 2c, it shows a schematic structural diagram of a motor frame according to some embodiments of the present disclosure. The motor frame 101 includes a first wall plate 1011, a second wall plate 1012, a third wall plate 1013, and a fourth wall plate 1014. The plate surface of the first wall plate 1011 is arranged opposite to the plate surface of the second wall plate 1012, and the first wall plate 1011 and the second wall plate 1012 are each provided with a groove 1015 in an edge end surface at the same end. The other ends of the first and second wall plates 1011 and 1012 opposite to the grooves 1015 are each provided with a first securing hole 1016. The third wall plate 1013 is arranged opposite to a surface of the fourth wall plate 1014, and the third wall plate 1013 and the fourth wall plate 1014 are connected to the first wall plate 1011 and the second wall plate 1012. The motor body 102 is disposed on a side, away from the cavity, of the third wall plate 1013, and the first shaft 103 runs through the third wall plate 1013 and extends to be movably connected to the fourth wall plate 1014.

In some embodiments, referring to FIG. 2a, the grooves 1015 are disposed at the ends, close to the securing mechanism 2, of the first and second wall plates 1011 and 1012. The first securing holes 1016 are disposed on side surfaces, close to an end of the support mechanism 3 and away from the cavity, of the first and second wall plates 1011 and 1012.

The securing frame 12 is adapted to the shape of the motor frame 101. The securing frame 12 is provided with second securing holes 120 corresponding to the positions of the first securing holes 1016, and the securing frame 12 and the motor frame 101 are securably connected by means of the second securing holes 120, the first securing holes 1016, and first connectors.

In some embodiments, the first securing holes 1016 are through holes running through the first wall plate 1011 or the second wall plate 1012 in the thickness direction thereof, or blind holes disposed in the side surfaces, away from the cavity, of the first and second wall plates 1011 and 1012. The second securing holes 120 are through holes provided in the securing frame 12. The first securing holes 1016 and the second securing holes 120 are threaded holes. The first connectors are screws, or a combination of screws and nuts.

The provision of the grooves 1015 can reduce the weight of the first wall plate 1011 and the second wall plate 1012 in one aspect, and in another aspect, can prevent the mutual collision and interference between the motor frame 101 and the securing mechanism 2 in the movement process of the motor module 10 as a whole relative to the slider 11, thereby reducing the resistance of the motor module 10 during the movement and then making the movement of the motor module 10 smoother.

In some embodiments, referring to FIGS. 2a and 2d, FIG. 2d shows a schematic structural diagram of a slider according to some embodiments of the present disclosure. An end, close to the securing mechanism 2, of the slider 11 is provided with third securing holes 111. The securing mechanism includes a securing seat 20, which is provided with fourth securing holes 201 corresponding to the positions of the third securing holes 111, and the securing seat 20 and the slider 11 are securably connected by means of the fourth securing holes 201, the third securing holes 111, and second connectors.

In some embodiments, the third securing holes 111 are through holes running through the slider 11 in the thickness direction thereof, or blind holes. The fourth securing holes 201 are through holes provided in the securing seat 20. The third securing holes 111 and the fourth securing holes 201 are threaded holes. The second connectors are screws, or combinations of screws and nuts.

In some embodiments, referring to FIG. 2b, the grooves 1015 are disposed at the ends, close to the support mechanism 3, of the first and second wall plates 1011 and 1012. The first securing holes 1016 are disposed on side surfaces, close to an end of the securing mechanism 2 and away from the cavity, of the first and second wall plates 1011 and 1012. The securing mechanism 2 includes a securing seat 20, which is adapted to the shape of the motor frame 201. The securing seat 20 is provided with fifth securing holes 202 corresponding to the positions of the first securing holes 1016, and the securing seat 20 and the motor frame 101 are securably connected by means of the fifth securing holes 202, the first securing holes 1016, and third connectors.

In some embodiments, the first securing holes 1016 are through holes running through the first wall plate 1011 or the second wall plate 1012 in the thickness direction thereof, or blind holes disposed in the side surfaces, away from the cavity, of the first and second wall plates 1011 and 1012. The fifth securing holes 202 are through holes provided in the securing seat 20. The first securing holes 1016 and the fifth securing holes 202 are threaded holes. The third connectors are screws, or combinations of screws and nuts.

The provision of the grooves 1015 can reduce the weight of the first wall plate 1011 and the second wall plate 1012 in one aspect, and in another aspect, can prevent the mutual collision and interference between the motor frame 101 and the support mechanism 3 in the movement process of the slider 11 as a whole relative to the motor module 10, thereby reducing the resistance of the motor module 10 during the movement and then making the movement of the motor module 10 smoother.

In some embodiments, referring to FIGS. 2b and 2e, FIG. 2e is a schematic structural diagram of another slider according to some embodiments of the present disclosure. An end, close to the support mechanism 3, of the slider 11 is provided with third securing holes 111. The lap plate 13 is provided with sixth securing holes (not shown in the figure) corresponding to the positions of the third securing holes 111. The lap plate 13 and the slider 11 are securably connected by means of the sixth securing holes, the third securing holes 111, and fourth connectors.

In some embodiments, the third securing holes 111 are through holes running through the slider 11 in the thickness direction thereof, or blind holes. The sixth securing holes are through holes provided in the lap plate 13. The third securing holes 111 and the sixth securing holes are both be threaded holes. The fourth connectors are screws, or combinations of screws and nuts.

In some embodiments, referring to FIG. 2e, the slider 11 includes a body portion 112 and a first protrusion portion 113. The first protrusion portion 113 is disposed on a side, close to the support mechanism 3, of the body portion 112. The third securing holes 111 are disposed in a side surface, close to the support mechanism 3, of the first protrusion portion 113.

In some embodiments, referring to FIG. 2f, it shows a schematic structural diagram of the assembly of the slider shown in FIG. 2e and a lap plate. The lap plate 13 is directly fitted to the side of the slider 11 provided with the third securing holes 111, the sixth securing holes 130 in the lap plate 13 are aligned with the third securing holes in the slider 11, and then, the slider and the lap plate are securably connected by means of the fourth connectors. The lap plate 13 acts on the slider 11 by means of the fourth connectors, such that the slider 11 drives the lap plate 13 and the support mechanism 3 to move.

In some embodiments, referring to FIG. 2g, it shows a schematic structural diagram of still another slider according to some embodiments of the present disclosure. The slider 11 includes a body portion 112 and a first protrusion portion 113. The first protrusion portion 113 is disposed on a side, close to the support mechanism 3, of the body portion 112, and the third securing holes 111 are disposed in a side surface, close to the fourth wall plate 1014, of the first protrusion portion 113.

In some embodiments, referring to FIG. 2h, it shows a schematic structural diagram of the assembly of the slider shown in FIG. 2g and a lap plate. The lap plate 13 is directly fitted to the side of the slider 11 provided with the third securing holes 111, the sixth securing holes in the lap plate 13 are aligned with the third securing holes 111 in the slider 11, and then, the slider and the lap plate are securably connected by means of the fourth connectors. The lap plate 13 acts on the slider 11 by means of the fourth connectors, such that the slider 11 pushes the lap plate 13 and the support mechanism 3 to move.

In some embodiments, referring to FIG. 2i, it shows a schematic structural diagram of still another slider according to some embodiments of the present disclosure. The slider 11 further includes a second protrusion portion 114 disposed on a side, close to the securing mechanism 2, of the body portion 112, and the second protrusion portion 114, the body portion 112 and the first protrusion portion 113 are integrally formed.

The provision of the second protrusion portion 114 can keep an overall gravitational equilibrium for the slider 11 to balance the overall force acting on the slider, which prevents the slider 11 from being locked with the first shaft 103 when moving relative to the first shaft 103, and ensures the smooth relative movement between the slider 11 and the first shaft 103.

Figure 3A:
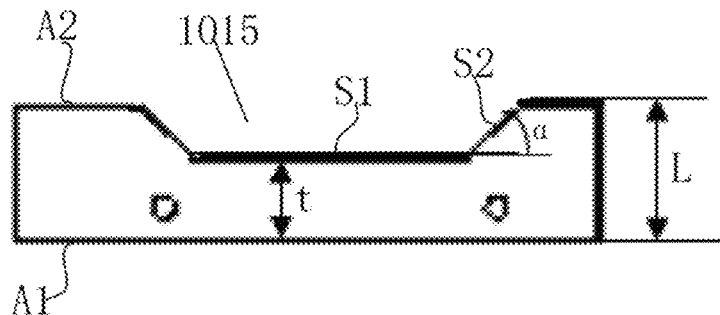
FIG. 3a shows a schematic sectional view of grooves in first and second wall plates according to some embodiments of the present disclosure.
Figure 3B:
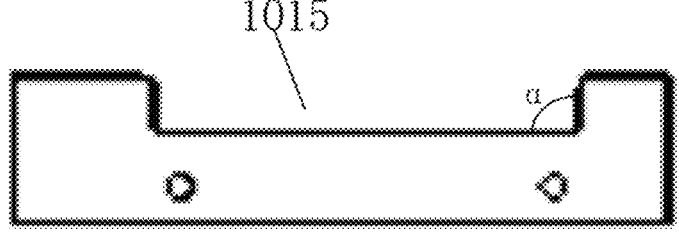
FIG. 3b shows a schematic sectional view of another grooves in first and second wall plates according to some embodiments of the present disclosure.
Figure 3C:
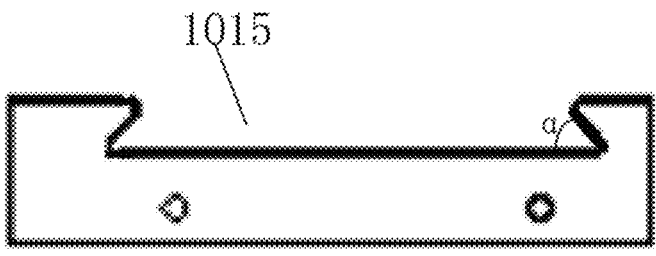
FIG. 3c shows a schematic sectional view of still another grooves in first and second wall plates according to some embodiments of the present disclosure.

In some embodiments, referring to FIGS. 3a, 3b and 3c, FIG. 3a shows a schematic sectional view of grooves in first and second wall plates according to some embodiments of the present disclosure. FIG. 3b shows a schematic sectional view of another grooves in first and second wall plates according to some embodiments of the present disclosure. FIG. 3c shows a schematic sectional view of still another grooves in first and second wall plates according to some embodiments of the present disclosure. The groove 1015 includes a bottom groove surface S1 and a side groove surfaces S2, and an angle $\alpha$ between the bottom groove surface S1 and the side groove surfaces S2 ranges from 45° to 135°. In this way, the structural strength of the first wall plate 1011 and the second wall plate 1012 can be ensured to meet the requirements in one aspect, and the weight of the first wall plate 1011 and the second wall plate 1012 can be reduced in another aspect, making it possible to move more conveniently and reduce the material cost.

In some embodiments, the shape of the orthographic projection of the groove 1015 on the surface of the first wall plate 1011 or the second wall plate 1012 includes an inverted trapezoid (referring to FIG. 3a), a rectangle (referring to FIG. 3b) or a trapezoid (referring to FIG. 3c).

In some embodiments, referring to FIG. 3a, the first wall plate 1011 includes a first edge end surface A1 and a second edge end surface A2 opposite to the first edge end surface A1. The groove 1015 is disposed on the second edge end surface A2, a distance between the bottom groove surface S1 of the groove 1015 and the first edge end surface A1 is t, and a distance between the first edge end surface A1 and the second edge end surface A2 is L, with 2t≥L. The second wall plate 1012 has the same size and shape as the first wall plate 1011. In this way, the structural strength of the first wall plate 1011 and the second wall plate 1012 can be ensured to meet the requirements in one aspect, and the weight of the first wall plate 1011 and the second wall plate 1012 can be reduced in another aspect, making it possible to move more conveniently and reduce the material cost.

Figure 4A:
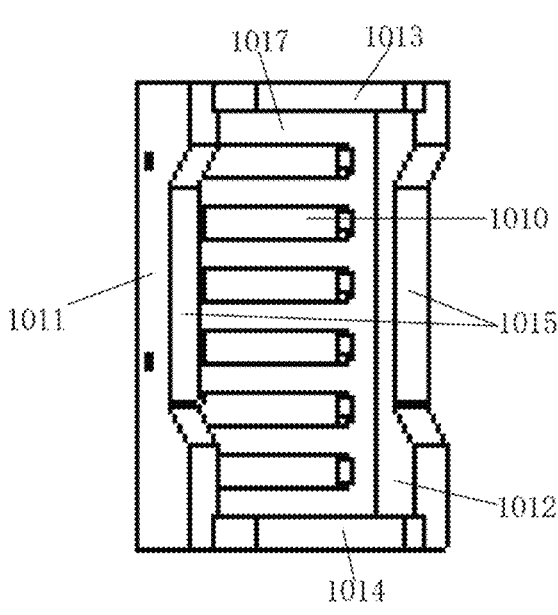
FIG. 4a shows a schematic structural diagram of another motor frame according to some embodiments of the present disclosure.
Figure 4B:
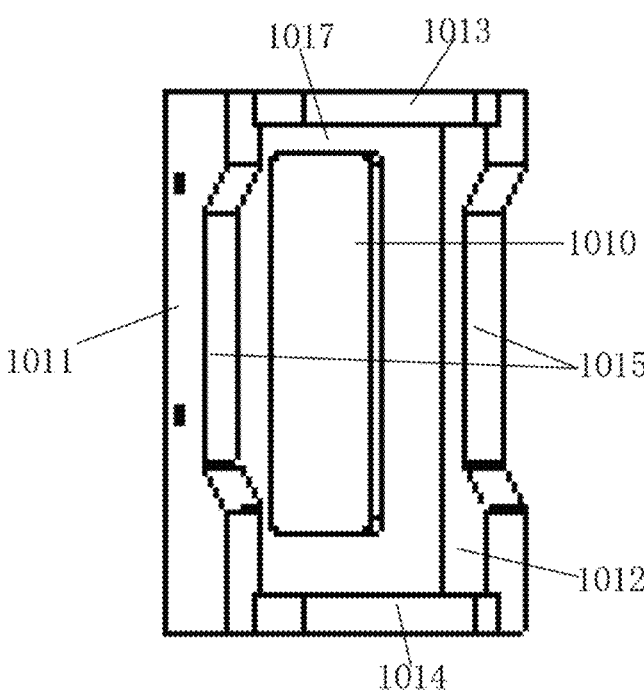
FIG. 4b shows a schematic structural diagram of further another motor frame according to some embodiments of the present disclosure.
Figure 4C:
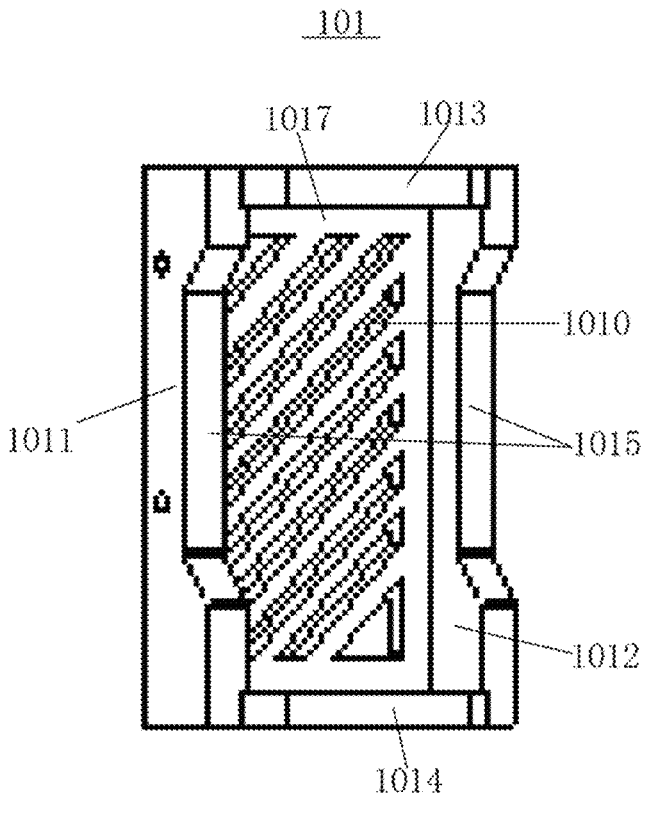
FIG. 4c shows a schematic structural diagram of still another motor frame according to some embodiments of the present disclosure.

In some embodiments, referring to FIGS. 4a, 4b, and 4c, FIG. 4a shows a schematic structural diagram of another motor frame according to some embodiments of the present disclosure. FIG. 4b shows a schematic structural diagram of further another motor frame according to some embodiments of the present disclosure. FIG. 4c shows a schematic structural diagram of still another motor frame according to some embodiments of the present disclosure. The motor frame 101 further includes a back wall plate 1017 disposed on the sides of the first and second wall plates 1011 and 1012 away from the grooves 1015 thereof. The back wall plate 1017 is connected to the first wall plate 1011, the second wall plate 1012, the third wall plate 1013, and the fourth wall plate 1014. A hollowed-out pattern 1010 is provided in the back wall plate 1017. In such a configuration, with respect to the motor frame in some practice, the structural strength of the motor frame 101 can be ensured to meet the requirements in one aspect, and the weight of the motor frame 101 can be reduced in another aspect, making it possible to move more conveniently and reduce the material cost.

In some embodiments, the orthographic projection of the hollowed-out pattern 1010 on the back wall plate 1017 is less than or equal to 50% of the area of the surface of the back wall plate 1017. In such a configuration, with respect to the motor frame in some practice, the structural strength of the motor frame 101 can be ensured to meet the requirements.

In some embodiments, the hollowed-out pattern 1010 includes any one of a rectangular opening (referring to FIG. 4b), a plurality of diagonal stripe openings (referring to FIG. 4c), a plurality of horizontal stripe openings (referring to FIG. 4a), and a grid opening.

In some embodiments, referring to FIGS. 2j and 2k, the motor frame 101 further includes a first guide rod 1018 and a second guide rod 1019. The first guide rod 1018 and the second guide rod 1019 are disposed between the third wall plate 1013 and the fourth wall plate 1014, and are connected to the third wall plate 1013 and the fourth wall plate 1014. The first guide rod 1018 and the second guide rod 1019 are parallel to each other. Referring to FIGS. 2d, 2e, 2g and 2i, the slider 11 is also provided with a seventh hole 115 and an eighth hole 116, which run through the thickness of the slider 11, the seventh hole 115 and the eighth hole 116 are disposed on two opposite sides of the first hole 110, the first guide rod 1018 runs through the seventh hole 115, and the second guide rod 1019 runs through the eighth hole 116. The coordination of the first guide rod 1018 with the seventh hole 115 and the coordination of the second guide rod 1019 with the eighth hole 116 can ensure the stability and balance of the slider 11 and prevent the slider 11 from being locked with the first shaft 103 in the case that the slider 11 moves up and down relative to the first shaft 103, thereby ensuring smooth, balanced and stable vertical movement of the slider 11 relative to the first shaft 103.

Figure 5A:
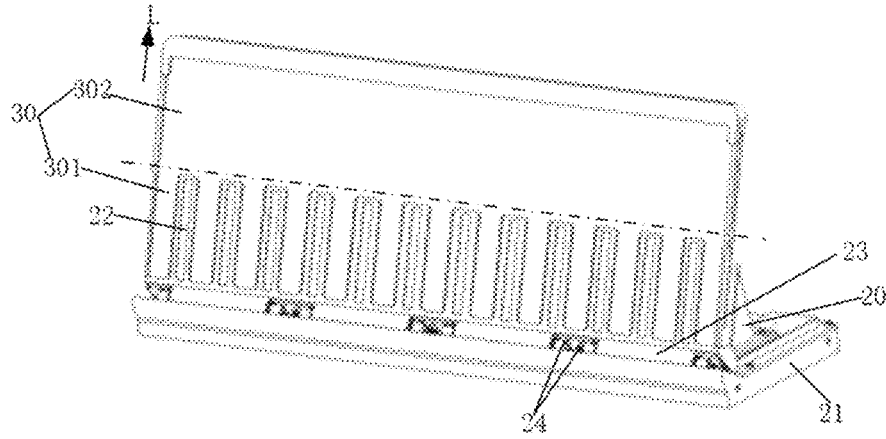
FIG. 5a shows still another schematic structural diagram of a vehicle-mounted display module according to some embodiments of the present disclosure.

In some embodiments, referring to FIG. 5a, it shows still another schematic structural diagram of a vehicle-mounted display module according to some embodiments of the present disclosure. The securing mechanism 2 further includes a storage box 21 and a first comb plate 22. The storage box 21 is disposed below the securing seat 20 and is securably connected to the securing seat 20. The storage box 21 is configured to store the deformable display screen in the rolled-up state. The storage box 21 is connected to the first comb plate 22, and an angle greater than 0° is formed between a plane where the storage box 21 is disposed and the first comb plate 22. The support mechanism 3 includes a support plate 30, which is disposed on the same plane as the first comb plate 22. The support plate 30 includes a first portion 301 and a second portion 302, which are formed into a whole, and the first portion 301 is disposed between the second portion 302 and the first comb plate 22. The first portion 301 has a comb structure, and the comb teeth of the first portion 301 are interleaved and meshed with the comb teeth of the first comb plate 22.

The comb teeth of the first portion 301 interleaved and meshed with the first comb plate 22 can move away from storage box 21 along with the support plate 30 in the first direction L for disengagement. The mutually interleaved and meshed comb teeth can form a support for the middle portion of the deformable display screen in the rolled-up state, and the disengaged comb teeth can form a support for the middle portion of the deformable display screen in the expanded state. Accordingly, the comb structure design of the first portion 301 and the first comb plate 22 can not only form a good support for the deformable display screen in the rolled-up and expanded states, but also can reduce the weight of the support mechanism 3, making the movement of the support mechanism 3 along with the drive mechanism 1 more convenient and simultaneously saving the material cost.

In some embodiments, an angle of 75° is formed between the plane where the storage box 21 is disposed and the first comb plate 22.

Figure 5B:
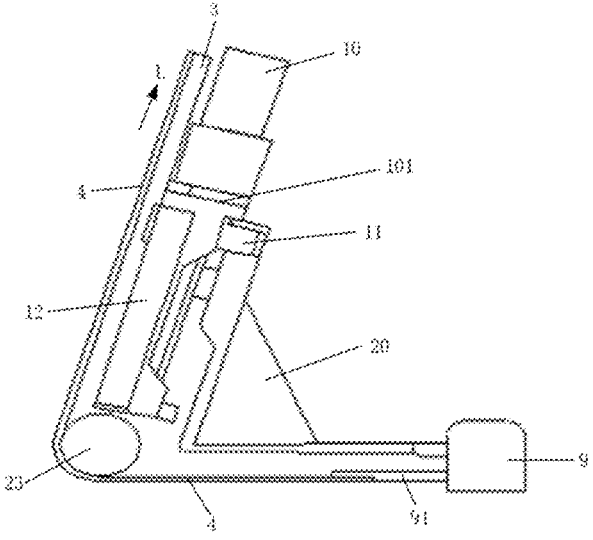
FIG. 5b shows a schematic structural sectional view of a vehicle-mounted display module according to some embodiments of the present disclosure.

In some embodiments, referring to FIGS. 5a and 5b, FIG. 5b shows a schematic structural sectional view a vehicle-mounted display module according to some embodiments of the present disclosure. The securing mechanism 2 further includes a reel 23 and a bearing 24, which are disposed in a connection region between the storage box 21 and the first comb plate 22, with the bearing 24 securably connected to the storage box 21, and with both ends of the reel 23 embedded into and movably connected with the bearing 24. The reel 23 is exposed in the connection region between storage box 21 and the first comb plate 22, to form a support for the deformable display screen 4.

Figure 6A:
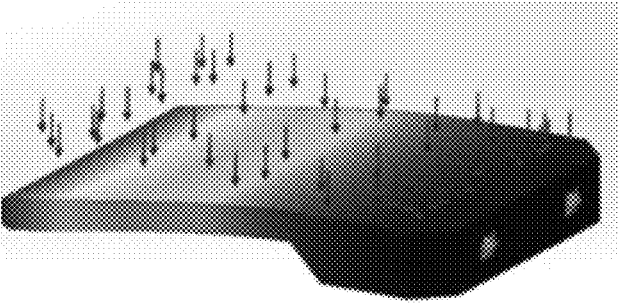
FIG. 6a shows a schematic force diagram of a first surface of a securing seat shown in FIG. 2a during strength simulation.
Figure 6B:
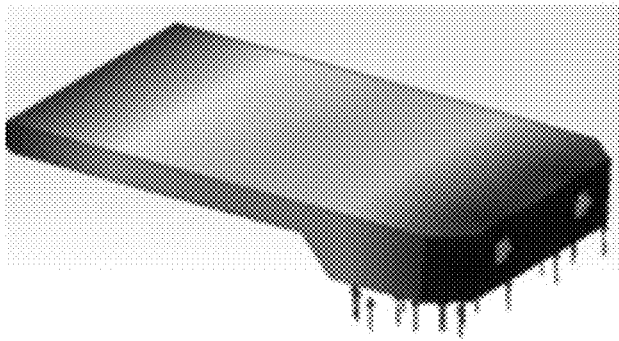
FIG. 6b shows a schematic force diagram of the second surface of the securing seat shown in FIG. 2a during strength simulation.

In some embodiments, referring to FIGS. 2a, 6a and 6b, FIG. 6a shows a schematic force diagram of a first surface of the securing seat shown in FIG. 2a in strength simulation. FIG. 6b shows a schematic force diagram of a second surface of the securing seat shown in FIG. 2a in strength simulation. The first surface of the securing seat is the one away from the slider, and the second surface of the securing seat is the one close to the slider. In the vehicle-mounted display module shown in FIG. 2a, the slider 11 is secured, and the motor module 10 moves relative to the slider 11 to drive the support mechanism 3 to move, thereby allowing the rolling-up and expanding of the deformable display screen. This puts a higher requirement for the pushing force of the motor module 10. The simulation shows that the securing seat 20 exhibits the maximum stress of $5.818 \times 10^6$, the yield force of $5.515 \times 10^7$, and the maximum deformation of 0.003 mm during simulation, indicating safe results.

Figure 7:
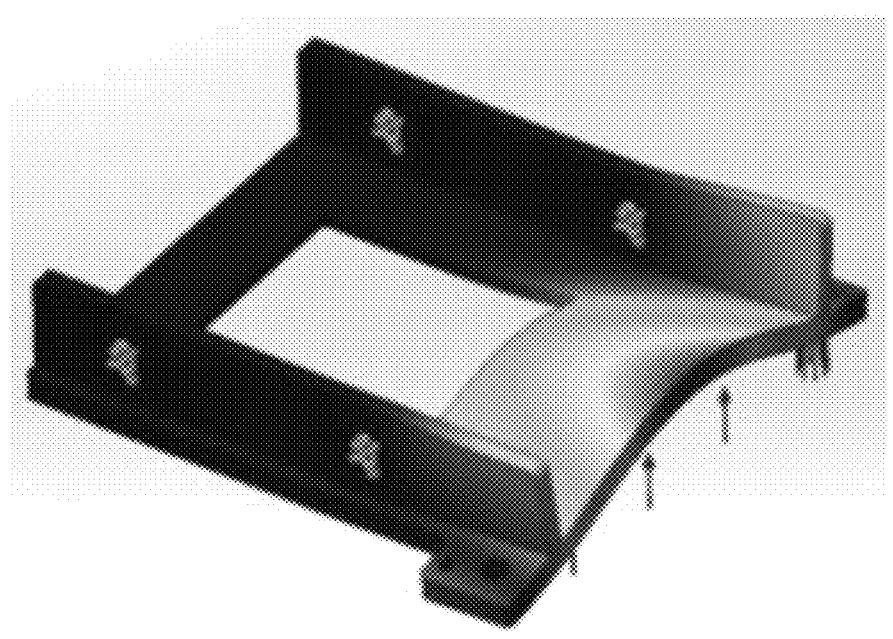
FIG. 7 shows a schematic force diagram of a securing frame shown in FIG. 2a during strength simulation.

In some embodiments, referring to FIGS. 2a and 7, FIG. 7 shows a schematic force diagram of a securing frame shown in FIG. 2a during strength simulation. The simulation shows that the securing frame 12 exhibits the maximum stress of $2.323 \times 10^7$, the yield force of $5.515 \times 10^7$, and the maximum deformation of 0.037 mm during simulation, indicating safe results.

Figure 8:
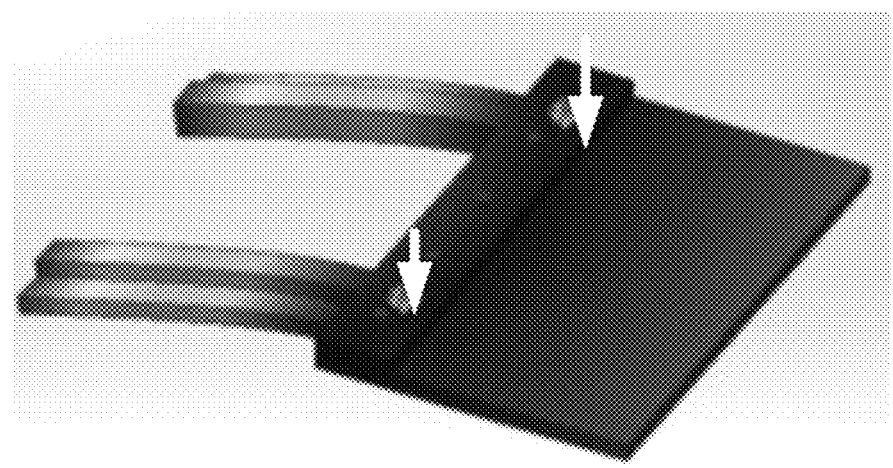
FIG. 8 shows a schematic force diagram of a lap plate shown in FIG. 2a during strength simulation.

In some embodiments, referring to FIGS. 2b and 8, FIG. 8 shows a schematic force diagram of a lap plate shown in FIG. 2b during strength simulation. In the vehicle-mounted display module shown in FIG. 2b, the motor module 10 is secured, the slider 11 moves relative to the motor module 10 to drive the support mechanism 3 to move, thereby allowing the rolling-up and expanding of the deformable display screen. For the vehicle-mounted display module shown in FIG. 2b, it is unnecessary to consider the self-gravitational force of the motor module 10, but only the strength of the lap plate 13 is needed, and the requirement for the pushing force of the motor module 10 is low, while the requirement for the material strength of the lap plate 13 is high. The simulation shows that the lap plate 13 exhibits the maximum stress of $3.946 \times 10^7$, the yield force of $5.515 \times 10^7$, and the maximum deformation of 0.146 mm during simulation, indicating safe results.

According to the vehicle-mounted display module provided in the embodiment of the present disclosure, in the case that the vehicle-mounted display module has a structure shown in FIG. 2a, the slider 11 is secured, and the motor module 10 moves relative to the slider 11 to drive the support mechanism 3 to move, thereby allowing the rolling-up and expanding of the deformable display screen. In the case that the vehicle-mounted display module has a structure shown in FIG. 2*b*, the motor module 10 is secured, and the slider 11 moves relative to the motor module 10 to drive the support mechanism 3 to move, thereby allowing the rolling-up and expanding of the deformable display screen. Therefore, the drive mechanism 1 allows and is compatible with two different drive modes. That is, the drive mechanism 1 allows and is compatible with two different force application modes. Hence, compared with the drive mechanism in some practice, the drive mode of the drive mechanism 1 in this embodiment is diversified, and can be selected for the vehicle-mounted display module in different application scenarios, which reduces the difficulty in driving the rolling-up and expanding of the deformable display screen in different application scenarios.

The vehicle-mounted display module provided in the embodiment of the present disclosure may be any product or component with a display function, such as an OLED plate, an OLED TV, an OLED billboard, a display, a mobile phone, and a navigator.

Some embodiments of the present disclosure further provide a vehicle. The vehicle includes the vehicle-mounted display module described in the above embodiments.

The vehicle may be a car, a train, a plane, or the like.

With the vehicle-mounted display module in the above embodiments, video watching in the vehicle is facilitated in one aspect, and in another aspect, the vehicle-mounted display module does not take up too much space in the vehicle and can be rolled up and expanded automatically.

It will be appreciated that the above embodiments are only exemplary embodiments intended to illustrate the principles of the present disclosure, but the present disclosure is not limited thereto. For those of ordinary skills in the art, various variations and improvements can be made without departing from the spirit and essence of the present disclosure, and these variations and improvements shall also be deemed as falling within the scope of protection of the present disclosure.

What is claimed is:

1. A vehicle-mounted display module, comprising: an auxiliary deformation device and a deformable display screen; wherein the auxiliary deformation device comprises a drive mechanism, a securing mechanism, and a support mechanism;

the securing mechanism is disposed on a side of the drive mechanism and is securably connected to the drive mechanism, and the securing mechanism is configured to secure a first local structure of the drive mechanism;

the support mechanism is disposed on a side, away from the securing mechanism, of the drive mechanism and is securably connected to the drive mechanism, and the support mechanism is configured to reciprocate in a first direction under drive of a second local structure of the drive mechanism;

a side, away from the drive mechanism, of the support mechanism is configured to support the deformable display screen; and one end of the deformable display screen is secured on the support mechanism, the other end of the deformable display screen is secured on the securing mechanism, and the deformable display screen is configured to expand or roll up under drive of the support mechanism;

wherein the drive mechanism comprises a motor module, a slider, and a securing frame;

the first local structure comprises the slider, wherein the slider is securably connected to the securing mechanism;

the second local structure comprises the motor module and the securing frame, and the securing frame is securably connected to the support mechanism and the motor module;

the motor module is movably connected to the slider; and the motor module is configured to reciprocate in the first direction relative to the slider, such that the support mechanism is driven to reciprocate in the first direction.

2. The vehicle-mounted display module according to claim 1, wherein the motor module comprises a motor frame, a motor body, and a first shaft;

the motor body is connected to the first shaft, wherein the first shaft is capable of rotating about an axis thereof under drive of the motor body;

the motor body is disposed on a side of the motor frame, and the first shaft runs through a cavity defined by the motor frame; and the slider is provided with a first hole running through the slider in a thickness direction thereof, the first shaft is adapted to the first hole and runs through the first hole, and the first shaft is capable of clockwise rotation and counterclockwise rotation to allow the slider to move up and down along the first shaft.

3. The vehicle-mounted display module according to claim 2, wherein the motor frame comprises a first wall plate, a second wall plate, a third wall plate, and a fourth wall plate;

a plate surface of the first wall plate is arranged opposite to a plate surface of the second wall plate;

a groove is formed on an edge end surface at one end of each of the first wall plate and the second wall plate;

a first securing hole is formed on the other end of each of the first wall plate and the second wall plate opposite to the groove;

a plate surface of the third wall plate is arranged opposite to a plate surface of the fourth wall plate, and the third wall plate and the fourth wall plate are connected to the first wall plate and the second wall plate; and the motor body is disposed on a side, away from the cavity, of the third wall plate, and the first shaft runs through the third wall plate and extends to be movably connected to the fourth wall plate.

4. The vehicle-mounted display module according to claim 3, wherein the grooves are disposed on the ends, close to the securing mechanism, of the first and second wall plates;

the first securing holes are disposed on side surfaces, close to an end of the support structure and away from the cavity, of the first and second wall plates;

the securing frame is adapted to a shape of the motor frame; and the securing frame is provided with second securing holes corresponding to positions of the first securing holes, and the securing frame and the motor frame are securably connected by means of the second securing holes, the first securing holes, and first connectors.

5. The vehicle-mounted display module according to claim 4, wherein an end, close to the support mechanism, of the slider is provided with third securing holes; and the securing mechanism comprises a securing seat, wherein the securing seat is provided with fourth securing holes corresponding to positions of the third securing holes, and the securing seat and the slider are securably connected by means of the fourth securing holes, the third securing holes, and second connectors.

6. The vehicle-mounted display module according to claim 5, wherein the securing mechanism further comprises a storage box and a first comb plate;

the storage box is disposed below the securing seat and is securably connected to the securing seat, the storage box is configured to store the deformable display screen in a rolled-up state;

the storage box is connected to the first comb plate, and an angle greater than 0° is formed between a plane where the storage box is disposed and the first comb plate;

the support mechanism comprises a support plate, wherein the support plate is disposed on the same plane as the first comb plate;

the support plate comprises a first portion and a second portion, wherein the first portion and the second portion are formed into a whole, and the first portion is disposed between the second portion and the first comb plate; and the first portion has a comb structure, and comb teeth of the first portion are interleaved and meshed with comb teeth of the first comb plate.

7. The vehicle-mounted display module according to claim 6, wherein the securing mechanism further comprises a reel and a bearing, wherein the reel and the bearing are disposed in a connection region between the storage box and the first comb plate, the bearing is securably connected to the storage box, and both ends of the reel are embedded into and movably connected to the bearing; and the reel is exposed in the connection region between the storage box and the first comb plate, to form a support for the deformable display screen.

8. The vehicle-mounted display module according to claim 3, wherein the grooves are disposed at the ends, close to the support mechanism, of the first and second wall plates;

the first securing holes are disposed on side surfaces, close to an end of the securing mechanism and away from the cavity, of the first and second wall plates;

the securing mechanism comprises a securing seat, wherein the securing seat is adapted to a shape of the motor frame; and the securing seat is provided with fifth securing holes corresponding to positions of the first securing holes, and the securing seat and the motor frame are securably connected by means of the fifth securing holes, the first securing holes, and third connectors.

9. The vehicle-mounted display module according to claim 8, wherein an end, close to the support mechanism, of the slider is provided with third securing holes; and the lap plate is provided with sixth securing holes corresponding to positions of the third securing holes, and the lap plate and the slider are securably connected by means of the sixth securing holes, the third securing holes, and fourth connectors.

10. The vehicle-mounted display module according to claim 9, wherein the slider comprises a body portion and a first protrusion portion; wherein the first protrusion portion is disposed on a side, close to the support mechanism, of the body portion; and the third securing holes are disposed in a side surface, close to the support mechanism, of the first protrusion portion, or the third securing holes are disposed in a side surface, close to the fourth wall plate, of the first protrusion portion.

11. The vehicle-mounted display module according to claim 10, wherein the slider further comprises a second protrusion portion disposed on a side, close to the securing mechanism, of the body portion; and the second protrusion portion, the body portion, and the first protrusion portion are integrally formed.

12. The vehicle-mounted display module according to claim 3, wherein the groove comprises a bottom groove surface and a side groove surface, and an angle between the bottom groove surface and the side groove surface ranges from 45° to 135°.

13. The vehicle-mounted display module according to claim 12, wherein a shape of an orthographic projection of the groove on a surface of the first wall plate or the second wall plate comprises a rectangle, a trapezoid or an inverted trapezoid.

14. The vehicle-mounted display module according to claim 12, wherein the first wall plate comprises a first edge end surface and a second edge end surface opposite to the first edge end surface;

the groove is disposed on the second edge end surface, and a distance between the bottom groove surface of the groove and the first edge end surface is t, a distance between the first edge end surface and the second edge end surface is L;

2t≥L; and the second wall plate has the same size and shape as the first wall plate.

15. The vehicle-mounted display module according to claim 3, wherein the motor frame further comprises a back wall plate disposed on sides of the first and second wall plates away from the grooves thereof; wherein the back wall plate is connected to the first wall plate, the second wall plate, the third wall plate, and the fourth wall plate; and a hollowed-out pattern is disposed in the back wall plate.

16. The vehicle-mounted display module according to claim 15, wherein an area of an orthographic projection of the hollowed-out pattern on the back wall plate is less than or equal to 50% of an area of a surface of the back wall plate.

17. The vehicle-mounted display module according to claim 3, wherein the motor frame further comprises a first guide rod and a second guide rod;

the first guide rod and the second guide rod are disposed between the third wall plate and the fourth wall plate, and are connected to the third wall plate and the fourth wall plate; the first guide rod and the second guide rod are parallel to each other; and the slider is provided with a seventh hole and an eighth hole, wherein the seventh hole and the eighth hole run through the slider in a thickness direction thereof, the seventh hole and the eighth hole are disposed on two opposite sides of the first hole, the first guide rod runs through the seventh hole, and the second guide rod runs through the eighth hole.

18. A vehicle-mounted display module, comprising: an auxiliary deformation device and a deformable display screen; wherein the auxiliary deformation device comprises a drive mechanism, a securing mechanism, and a support mechanism;

the securing mechanism is disposed on a side of the drive mechanism and is securably connected to the drive mechanism, and the securing mechanism is configured to secure a first local structure of the drive mechanism;

the support mechanism is disposed on a side, away from the securing mechanism, of the drive mechanism and is securably connected to the drive mechanism, and the support mechanism is configured to reciprocate in a first direction under drive of a second local structure of the drive mechanism;

a side, away from the drive mechanism, of the support mechanism is configured to support the deformable display screen; and one end of the deformable display screen is secured on the support mechanism, the other end of the deformable display screen is secured on the securing mechanism, and the deformable display screen is configured to expand or roll up under drive of the support mechanism;

wherein the drive mechanism comprises a motor module, a slider, and a lap plate;

the first local structure comprises the motor module, wherein the motor module is securably connected to the securing mechanism;

the second local structure comprises the slider and the lap plate, and the lap plate is securably connected to the support mechanism and the slider;

the motor module is movably connected to the slider; and the slider is configured to reciprocate in the first direction relative to the motor module, such that the support mechanism is driven to reciprocate in the first direction.

19. A vehicle, comprising: a vehicle-mounted display module;

wherein the vehicle-mounted display module comprises: an auxiliary deformation device and a deformable display screen; wherein the auxiliary deformation device comprises a drive mechanism, a securing mechanism, and a support mechanism;

the securing mechanism is disposed on a side of the drive mechanism and is securably connected to the drive mechanism, and the securing mechanism is configured to secure a first local structure of the drive mechanism;

the support mechanism is disposed on a side, away from the securing mechanism, of the drive mechanism and is securably connected to the drive mechanism, and the support mechanism is configured to reciprocate in a first direction under drive of a second local structure of the drive mechanism;

a side, away from the drive mechanism, of the support mechanism is configured to support the deformable display screen; and one end of the deformable display screen is secured on the support mechanism, the other end of the deformable display screen is secured on the securing mechanism, and the deformable display screen is configured to expand or roll up under drive of the support mechanism;

wherein the drive mechanism comprises a motor module, a slider, and a securing frame;

the first local structure comprises the slider, wherein the slider is securably connected to the securing mechanism;

the second local structure comprises the motor module and the securing frame, and the securing frame is securably connected to the support mechanism and the motor module;

the motor module is movably connected to the slider; and the motor module is configured to reciprocate in the first direction relative to the slider, such that the support mechanism is driven to reciprocate in the first direction.

* * * * *